July 11, 1967 — H. ZIMMERMANN — 3,330,517
PIPE CLAMP
Filed June 7, 1965 — 2 Sheets-Sheet 1
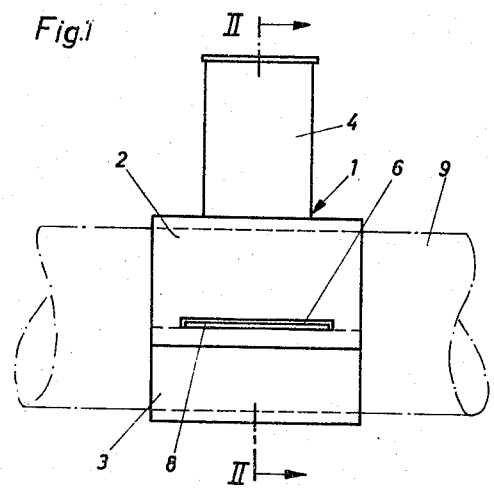
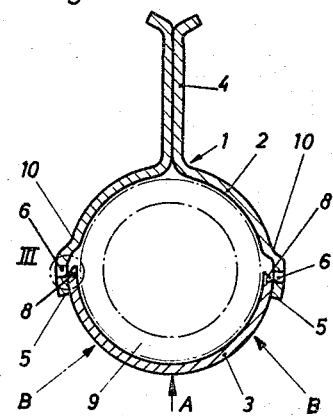
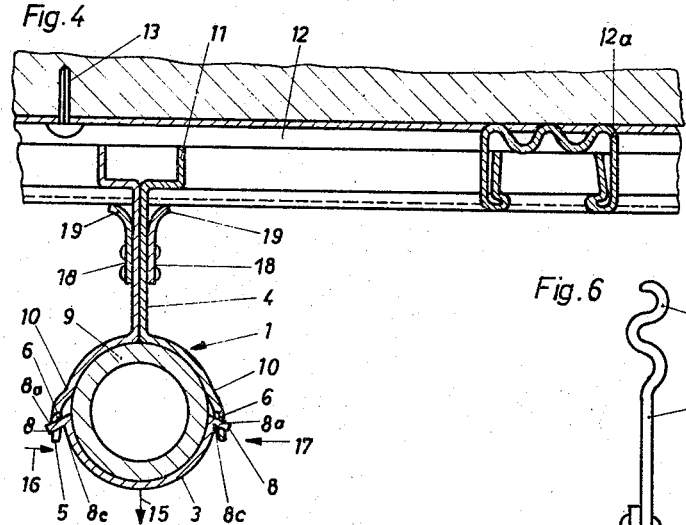
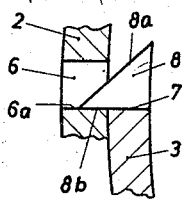
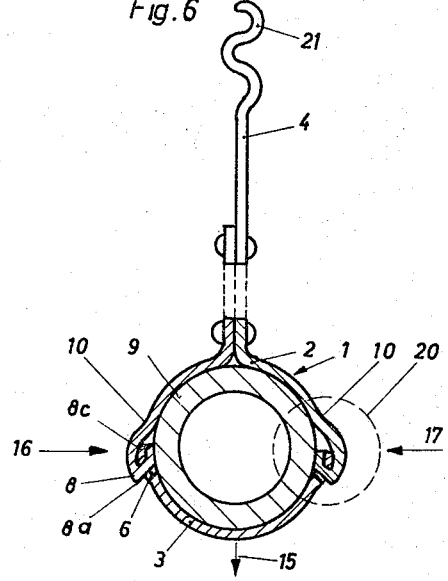
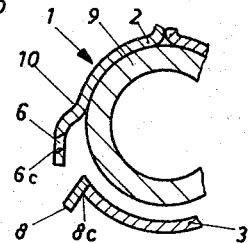
INVENTOR.
HANS ZIMMERMAN
BY Woodhams, Blanchard and Flynn
ATTORNEYS

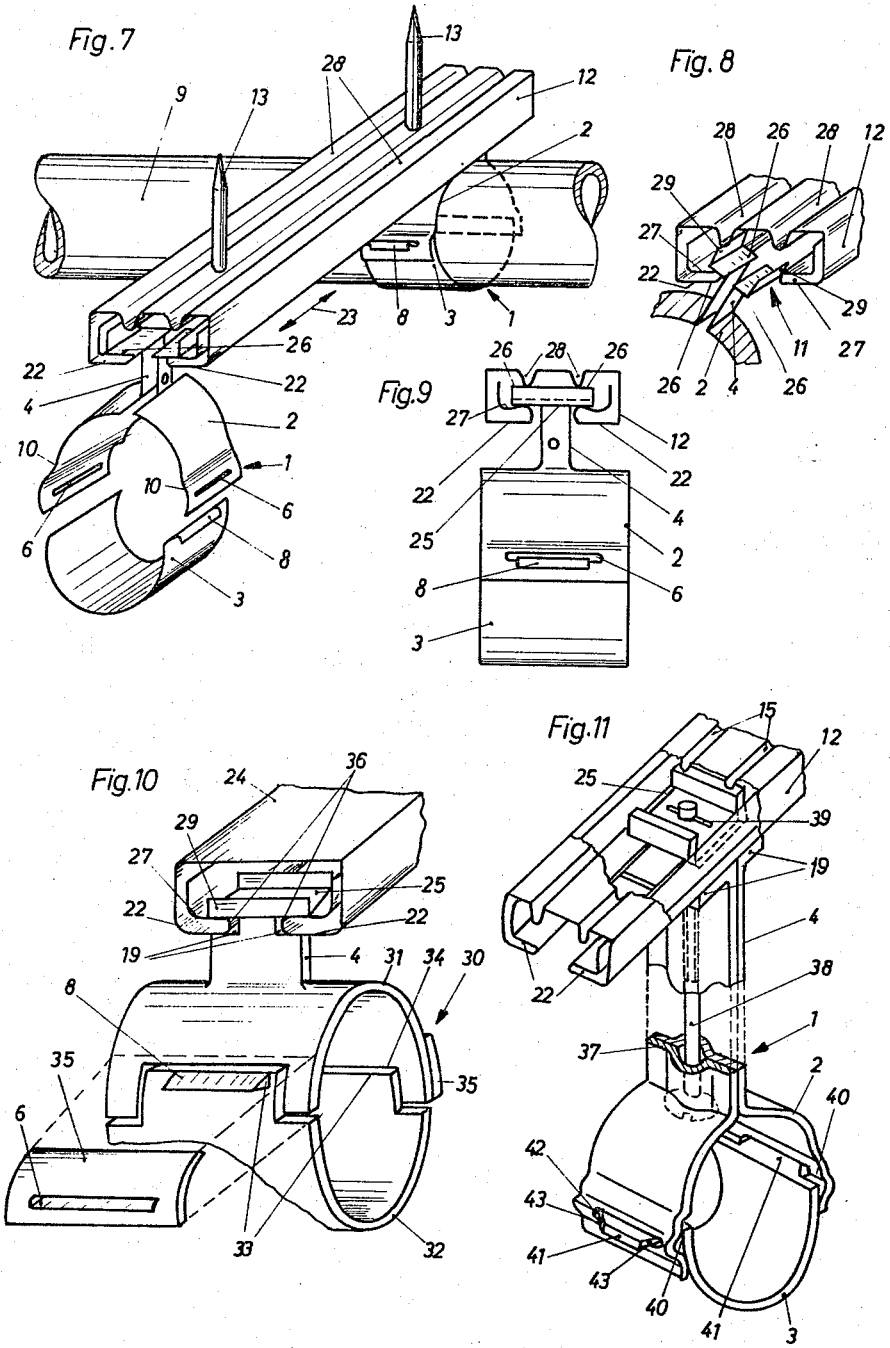

United States Patent Office 3,330,517
Patented July 11, 1967

3,330,517
PIPE CLAMP
Hans Zimmermann, Langentalstrasse 60–66,
Geislingen, Steige, Germany
Filed June 7, 1965, Ser. No. 461,710
Claims priority, application Germany, June 22, 1964,
Z 10,926; Nov. 6, 1964, Z 11,158; Nov. 9, 1964,
Z 11,163
3 Claims. (Cl. 248—62)

This invention relates to a pipe clamp and particularly to a type thereof consisting of two half shell means which, when connected, will form a cylindrically shaped housing and which are connectible to each other through suitable cooperative connecting means and which are readily disconnectible from each other. The invention further contemplates a provision of suitable attachment means on at least one of said half shells for fastening same to a supporting surface.

In known pipe clamps both half shells include two projecting, perforated flanges which upon closing of the clamp are fixed together by a bolt. Such closing means for the pipe clamp is inconvenient to use on account of the necessity of inserting two bolts and securing them with nuts. It becomes further difficult upon subsequent opening of the pipe clamp since the bolts are often covered over with paint or have become rusted so that it is very difficult to again loosen them. Further, the known pipe clamps including the bolts and nuts are comprised of at least six parts which makes the installation more difficult. Further, the flanges extend radially from the surface of the pipe which in many cases is undesirable for aesthetic reasons.

In addition to the pipe clamps whose holding means consist only of an attachment device, there are clamps known in which each holding device includes supplementarily a mounting rail having a slotted cross-sectional profile by which is connected the attachment means arranged on each of the half shells, for example, by means of bolts or bayonet joint means. To the extent that this last-named attachment means includes a threaded connection between the mounting rails and the hanger means, they are subjected to the disadvantage that the bolts or nuts associated therewith are insertable only in a lengthwise direction with respect to the mounting rails and are not capable of being made fast in same before the mounting of the pipe clamp. Because of this, there occurs in the mounting operation a considerable loss of time in that the bolts and nuts on the several mounting rails provided for alignment of the pipe sections cannot be affixed before the mounting of the pipe in corresponding alignment. Further, the known fastening means of the kind involving bayonet closures provide no possibility of locating the mounting rails in their several positions before the mounting of the pipe in the pipe clamps so that a fastening of the pipe sections before the mounting of same is not possible. As a consequence, there often occurs a misalignment of the alignment guide. Corrections of such misalignments are possible only with difficulty because during the mounting of the pipe either the mounting rails or the other mounting means often become distorted which make subsequent corrections very difficult or entirely impossible. Since in building operations it very often happens that pipe lines are to be installed in places of difficult accessibility and since this work usually is carried out by hand, neither the known pipe clamps of the previously described kind nor the previously known hanger devices are effective in building operations because of the large amount of time required for handling same and the resulting high installation cost.

The purpose of the invention is, therefore, to provide a pipe clamp of the previously defined type with mounting devices appropriate for mounting same on a supporting surface which make possible an effortless and rapid pipe installing operation, including installation in locations which are difficult of access, and which may be carried out advantageously either by hand or with only conventional tools. These objectives are accomplished according to the invention in that the connecting means are provided with snap closures, which are of radially elastic nature whereby at least one half shell is openable and closable.

In the pipe clamp according to the invention, the closing is brought about by pushing together one or both half shells to effect a simultaneous elastic deformation. After the required movement, the snap closure takes place and the pipe clamp is closed. In order again to open it, it is required only to again elastically deform one or both half shells and to withdraw the one from the other. Since the parts of the snap closure are included in the two half shells, no further connecting means are required. Therefore, the handling of the pipe clamp is not only materially simplified but also the number of the parts constituting the pipe clamp are diminished. Likewise freedom is secured from difficulties in connection with opening of the pipe clamp since the snap closure can be released even if it is covered over with paint or the pipe clamp has become rusted. If a particularly aesthetic appearance is desired, the pipe clamp according to the invention can be provided without projecting flanges. The snap closure is applied directly to the half shells, the same forming a cylindrical cover for the pipe.

Further features and advantages of the invention will be set forth in the hereinafter following description, together with the accompanying drawings, in especially advantageous arrangements in that the pipe clamp, in order to provide an essentially easier assembly of a pipe system on a supporting surface, is provided with a support means consisting of hanger means which can be brought to the supporting surface from a direction perpendicular to the lengthwise direction of the pipe and said hanger means including bayonet fastening means. The pipe clamp is provided further with mounting rails having undercut portions which are cooperable with bayonet closure parts whereby said hangers are freely lengthwise slideable in the carrier rail before the closing of the bayonet lock but are nevertheless fixed in the desired position of use by a simple rotation. Such carrying apparatus provides in a simple manner for applying of piping in a desired position on the carrying surface whereby all mounting work may advantageously be done by hand or at the most by use of conventional tools such as screw drivers. The labor cost portion of the pipe installation can thereby be substantially reduced.

In the drawings several embodiments of the invention are set forth. The drawings show:

FIGURE 1, a side view of a pipe clamp according to the invention in closed condition.

FIGURE 2, a cross section through the pipe clamp according to FIGURE 1 taken on the line II—II.

FIGURE 3, an enlarged detail of a fragment indicated at III of FIGURE 2.

FIGURE 4, a vertical section through a modified embodiment of the pipe clamp utilizing bayonet type fastening means.

FIGURE 5, a vertical section through the shell halves of a pipe clamp comprised of a material of greater thickness.

FIGURE 6, a partial vertical section through a further modified embodiment of a pipe clamp.

FIGURE 7, a schematic presentation of a support means for a pipe which is constructed from pipe clamps according to the invention as a two-part holding apparatus.

FIGURE 8, the insertion of an open pipe clamp into a supporting device according to FIGURE 7.

FIGURE 9, a vertical section through a carrier rail according to FIGURE 7 with a closed pipe clamp fixed therein in its position of use.

FIGURE 10, a schematic, perspective view, of carrier apparatus with a modified embodiment of the pipe clamp and holding means.

FIGURE 11, a schematic and partially in section perspective view of support apparatus with a further altered embodiment of the pipe clamp and holding means.

In the drawings, the numeral 1 designates the entirety of a pipe clamp corresponding to the invention. It consists of a first half shell 2 and a second half shell 3 both of which are shaped essentially to form a sector of a cylinder. The half shell 2 is provided with a hanger 4 which serves to mount the half shell on a suitable supporting surface (not shown) such as a wall or a ceiling. The hanger illustrated is shown in the illustrated embodiment as a wall anchor which can be cemented or plastered into place. In the region of the circumferential ends 5, the half shell 2 is provided with lengthwise slots 6 which extend over the greater part of the axial length of the half shell, but which are nevertheless closed at both ends. At the circumferential ends 7 (FIGURE 3) of the half shell 3, are mounted the support hooks 8 of length somewhat smaller than the lengths of the slots 6. The support hooks 8 are provided with an angular surface 8a and a radially extending support surface 8b.

The use of the described pipe clamp will take place in the following manner:

First the half shell 2 is fixed to a supporting surface by means of its hanger 4. Now the pipe or tube 9, illustrated by broken lines in the drawing, is fitted into the half shell 2, after which the half shell 3 is pressed into the half shell 2 in the direction of the arrow A in FIGURE 2. Thus, the angular surface 8a engages with the circumferential edge 5 of the half shell 2. The half shell 2 is thereby expanded and the half shell 3 is compressed. This last is possible in spite of the presence of the pipe 9 since some play is provided between the pipe clamp and the pipe. The edges 7 (FIGURE 3) of the half shell 3 can therefore, along with the projections 8, be sufficiently urged into the half shell 2 that there is provided an overlapping between the two half shells in the region of the edges 5 and 8. As soon as the support surface 8b passes the bottom surface 6a (see FIGURE 3) of the slots 6, the expanded half shell 2 springs together and the compressed half shell 3 springs apart so that the projections 8 lock into the slots 6. It is obvious in this connection that the two half shells consist of an elastic material, for example, steel sheet. Movement of the half shells 2 and 3 away from each other is then prevented through the engagement of the support surfaces 8b onto the peripheral surfaces 6a. When the pipe 9 is to be unmounted, the half shell 3 is urged in the direction of the arrows B, either by means of a suitable tool or by hand, until the projections 8 are moved out of the slots 6. Then the half shell 3 can be drawn out of the half shell 2 oppositely to the direction of the arrow A.

As shown in FIGURE 2 the half shell 2 is provided at 10 with an offset so that the half shell 3 can be shoved onto the half shell 2 without any essential departure from the cylindrical form to be produced on the resulting inner surface of the half shells 2 and 3.

The invention is not limited to the illustrated embodiments. The hanger means 4 can be advantageously provided in several ways, which require only that the pipe clamp be firmly held. For example, the hanger means 4 may consist of a wood or metal screw, a threaded bolt or a construction with bayonet mounting parts by which the half shell 2 can be mounted on suitably shaped rails which in turn are provided with appropriate bayonet mounting parts. Further, the connecting means between the hangers and support rack can be altered in many ways.

An insulating layer may be arranged between the inner surface of the half shells and the pipe 9, if desired.

According to FIGURE 4, the pipe clamp 1 is provided with a hanger 4 whose free upper end is provided with a bayonet joint part 11 which, for example, together with a carrying rail 12 having the cross-sectional profile 12a, constitutes a bayonet joint and is fastened in its position of use with respect to the carrying rails through rotating of the pipe clamp 1. The support rails 12 can in a known manner, for example by means of self-tapping screws 13, be brought to a supporting surface 14. The pipe clamp 1 set forth in FIGURE 4 consists similarly of two cylinder forming half shells 2 and 3 which are provided with a support cavity 6 and the support projection 8. The support surface of each support projection 8 is constructed as a pressure surface 8c acutely angled with respect to the wall of the half shell carrying same.

The pipe 9 which is carried by the pipe clamp 1 provides a radial force acting in a direction of the arrow 15 and thereby exerts a force component acting in the direction of the arrows 16 and 17 through the pressure surfaces 8c onto the slotted edges 5 of the half shell 2. This force component effects a slight pressing of the half shell 2 onto the outer surface of the pipe 9 and also a safetying in its closed position of the snap lock provided by the projection 8 and the slot 6.

Upon pushing together of the half shells 2 and 3, the angular upper surface 8a of the projection 8 causes a limited spreading of the upper half shell 2 which accordingly must have some radial elasticity. In order to improve this elasticity the upper half shell 2 together with the hanger means 4 arranged thereon can, according to FIGURE 4, be constructed in two parts and can be connected together at a point spaced from the half shell walls. It is also possible, for the reinforcement of the hangers 4, to provide reinforcing plates 18 at a point above the point of fastening of same together, the under edges of said reinforcing plates 18 being spaced from and parallel to the walls of the half shells 2.

As already above mentioned, the upper end of the hanger 4 is provided with locking means 11, which cooperates with the bottom flanges of the carrying rails 12 to provide an effective lock. Such a lock can be constructed with shoulders 19 which in the selected position of the hanger 4 press against the underside of the carrying rails 12. In the embodiment of the pipe clamp according to the invention illustrated in FIGURE 4, the reinforcing plates 18 are bent outwardly at a point underneath the lock parts 11 to constitute the shoulders 19.

In the tube clamp 1 of larger dimensions, the projections 8 can, according to FIGURE 5, be constructed in the form of a flange with a smooth rectangular cross section, arranged on the half shell carrying same at an acute angle relationship to the wall of said half shell and affixed thereto in any convenient manner, such as by welding. The underside of this flange thus provides the pressure surface 8c while the upper side provides the angular surface 8a for rendering easier the interengagement of the half shells 2 and 3. FIGURE 5 shows further a desirable example of a locking cavity 6 whose undersurface constitutes a pressure opposing surface 6c running parallel to the opposed surface 8c of the flange 8. Obviously it is also possible to permit the upper edge of the locking slot 6 to extend parallel to the pressure opposing surface 6c, as is shown in FIGURE 5.

In the further modified example of the pipe clamp 1, according to FIGURE 6 the projections 8 are arranged on the half shell 2 and the locking cavities 6 are arranged on the half shell 3. In this embodiment the pressure surfaces 8c are likewise sloped angularly to the wall of the half shell carrying same and are directed inwardly with respect to said half shell. Also, in this embodiment of the invention the force components 16 and 17, which are directed oppositely to each other and against the wall of the pipe 9 act against the half shell 2 to effect both a tight clamping of the pipe 9 by the half shell 2 and an effective reinforcement of the projections 8 against the pipe wall. Thus, the greater the radial pressure of the pipe 9 in the direction of the arrow 15 onto the half shell 3, the tighter the projections 8 press against the pipe wall and the more effectively they are safetied against bending out. By the two part construction of the half shell 2 and by the hangers 4 arranged thereon, it is possible, as shown in FIGURE 6, to construct one-half of the half shell 2 within an elongated hanger 4 and to attach at the free end a suitable fastening device, such as, for example, a wall hook 21. In this way, the manufacturing cost of the pipe clamp according to the invention is still further reduced.

In contrast to the embodiments shown in FIGURES 1–6, it is also possible to provide a projection 8 along with the locking slot 6 adjacent only one edge 5 of the half shells 2 and 3. The other edge is provided with hinge means, as is indicated by way of example within the broken line 20 of FIGURE 6.

The embodiment of the pipe supporting device set forth in FIGURE 7 provides support rails 12 which can be brought to a support surface (not shown) from a direction perpendicular to the lengthwise direction of the pipe 9 and fastened thereon by any convenient fastening devices, such as nails or self-tapping screws 13. The support rail 12 is, for example, bent out of thin sheet steel and provides a hollow profile with a downwardly directed slot on the lower side thereof.

For the fastening of the pipe 9 to the carrier rails 12, the pipe clamp 1 is similarly provided with a hanger 4 having lock parts 11 (FIGURE 8) whereby a lock will be closed by a simple rotation of the half shell connected thereto in its position of use, as shown in FIGURES 9 and 10. The pipe clamp 1 is thus rendered fixed with respect to the carrier rails 12 and thereby also with respect to the supporting surface. The pipe 9 may now be laid against the half shell 2 and by the application of the second half shell 3 said pipe can be fastened in place.

According to FIGURES 8 and 9, a hanger flange 25, insertable into the space provided between the bottom flanges 22 of the carrying rails 12, is arranged so that its projections 26 will overlie said flanges in order to provide a lock arrangement 11 on the upper end of the hanger 4. The hanger flange 25 can, according to FIGURE 8, be inserted angularly from below into the space between the flanges 22 and lies, according to FIGURE 7, after swinging into a horizontal position, slideably within the supporting rails with the lower surfaces of said hanger flange 25 on the upper walls 27 of the flanges 22.

There is then effected a right-angular rotation of the half shell 2, which results in the corresponding rotation of the hanger 4 fastened thereto around its vertical axis in the positions of use according to FIGURE 9, and the projection 26 of the hanger flange 25 rests on the upper walls 27 of the flanges 22.

Resilient pressure means, for example in the form of inwardly turned lengthwise ribs 28, in the upper wall of the support rails engage against the hanger flange 25 shortly before it reaches its final position and thereby presses same against the upper surfaces 27 of the flanges 22. The edges of the hanger flange 25 are provided with the upwardly extending beads 29 which do not engage the lengthwise ribs 28 prior to reaching the position of use, since they are provided with a greater lateral spacing than are said ribs 28. However, shortly before reaching the position of use, the beads 29 are sufficiently crosswise of the lengthwise ribs 28 as to engage same and thereby urge the hanger flange 25 resiliently against the upper surfaces 27 whereby said hanger flange 25 is no longer movable therealong.

In the support apparatus illustrated in FIGURE 10, a thick walled pipe clamp 30 is used which, for example, can serve for the reception of larger and harder pipe. While in a clamp for thin-walled pipe, according to FIGURES 7–9, the interengagement of the half shells 2 and 3 is possible through the offset 10 at the axial edges thereof, it is advantageous to provide also the half shells 31 and 32 built according to FIGURE 10. Through proper shaping of the axial edges, for example, by providing tongues or tabs 33 extending from the half shell 32, same are insertable into corresponding recesses 34 of the half shell 31. While the projection 8 can be applied without difficulty to the tongues 33, the locking slots 6 are provided in curved plates 35 and these latter are fastened to the half shell 31 to overlap the cavity 34.

The projections 8 can without difficulty be applied to the tabs 33, and the slots 6 can be provided in the curved plates 35 and these latter then fastened in overlapping relationship to the recesses 34 in the half shell 31.

The carrier rail 24 set forth in FIGURE 10 includes a planar upper surface but is nevertheless similarly made from elastic material, for example, sheet steel. In this carrier rail 24, the resilient pressure means are provided for the purpose of holding the pipe clamp 30 snugly in its position of use against the flanges 22. On the hanger 4 and located below the stop 25 there are provided the shoulders 19 positioned on either side of the gaps 36 between said respective flanges and the adjacent portion of the hanger 4, said shoulders 19 being arranged for bearing against the lower walls of the flanges 22 only when the support is located in the position of use. The gaps 36 are of a somewhat narrower width than the thickness of the flanges 22 so that said flanges in the position of use can be elastically deformed into said gaps 36. Thus, further movement of the pipe clamp 30 lengthwise in the direction of the carrier rails 24 will in this manner be efficiently prevented.

In the carrying apparatus set forth in FIGURE 11, a hollow hanger 4 is on the pipe clamp 1 and has the shoulders 19 arranged on the end thereof remote from the shell end. The locking structure includes the stop 25 and has a threaded opening therein in which a threaded bolt 38 is threadedly received in the lengthwise direction through the hollow opening in the profile 37 thereof so that the hanger 4 can be brought towards the shoulder or step 19, whereby said shoulders 19 engage the underside of the carrier rail 12. Through rotation of the threaded bolt 38, the interval between the shoulders 19 and the stop 25 can be sufficiently narrowed that the pipe clamp 1 is drawn solidly against the carrier rail 12. Before the connection of the hanger 4 to the stop 25, said stop 25, in a manner already described, will be introduced into the spaces within the carrier rail 12 and after free lengthwise adjustment to the desired position will be made fast by a 90 degree rotation. The stop 25 has a suitable engaging means for a conventional operating tool located therewithin between the flanges 22. The engaging means can, for example, comprise the slot 39 in which a screw driver can be inserted from below.

FIGURE 11 further shows a pipe clamp 1 whose half shells are not brought together in the radial direction set forth in FIGURES 1–10 but instead are brought together and/or apart in an axial direction.

The cavities in this unit are for this purpose arranged in axial directions with respect to the axes of the half shell 2 and include groove-shaped guide parts 40 in which the tabs 41 provided as the guided parts on the half shell 3 are introduced and guided. Simple locking means are provided by the groove-shaped guide grooves 40 cooperating with the slots 42 through which the tabs 41 extend upon radial spreading of the half shell 2 into locking position in the manner described above. Advantageously the tabs 41 are provided with angular surfaces in the form of radially converging edges 43, whereby the radial widening of the half shell 2 is facilitated during the axial movement of the half shell 3 into the half shell 2.

Although the description and drawings are directed toward certain preferred embodiments of the invention, it is possible within the scope of the hereinafter appended claims to provide various alterations of the expressely disclosed forms capable of serving the purposes of the present invention. For example, the engaging means can appear as pins, knobs or points whose locking on either side of the pipe clamp will make use of the radial elasticity thereof. For the mounting apparatus, a support device made from appropriate plastic material can be used in place of a carrying rail bent from steel sheet, provided only a sufficient radial elasticity is available and a sufficient deformation is possible in strongly constructed flanges 22.

Further features can be derived from the description and drawings together with various construction details together with those set forth in the preferred combinations all within the scope of the invention.

The embodiments of the invention in which an exclusive property or privilege is claimed are defined as follows:

1. A device for supporting pipes, comprising:
   an elongated generally channel-shaped carrier rail having lateral flanges projecting toward each other and defining a slot therebetween;
   a pipe clamp comprising a plurality of sections having mating recesses therein defining an opening through which a pipe can extend and snap-lock means for releasably connecting together said sections;
   one of said sections having a hanger extending away from said opening and means defining an enlarged head on the end of said hanger remote from said opening, said hanger extending through said slot and being of smaller width than said slot so that said hanger can be pivoted in said slot between a first position and a second position in which it extends transverse to said first position;
   said head being so constructed that it is movable through said slot from the outside of said rail into the interior thereof when said hanger is in said first position, said head having transverse webs which are engageable with said flanges in said second position of said hanger; and
   means for resiliently clamping said webs against said flanges in said second position of said hanger.

2. A device according to claim 1, in which the head is comprised of oppositely projecting webs having beads extending therefrom toward the base wall of said carrier rail, said base wall having inwardly projecting lengthwise extending ribs which engage said beads in said second position of said hanger, said heads and said ribs forming said resilient clamping means.

3. A device according to claim 1, in which said hanger has shoulders extending transversely thereto and spaced from and opposed to said webs, said flanges on said carrier rail being received between and snugly resiliently gripped by said webs and said shoulders in said second position of said hanger, said shoulders forming said resilient clamping means.

References Cited

UNITED STATES PATENTS

| | | | |
|---|---|---|---|
| 801,409 | 10/1905 | Smith | 248—62 X |
| 1,041,264 | 10/1912 | Freud | 248—245 |
| 1,129,782 | 2/1915 | Bissell et al. | 248—74 X |
| 2,375,513 | 5/1945 | Bach | 248—62 X |
| 2,915,267 | 12/1959 | Kaysing | 248—67.5 |

FOREIGN PATENTS

| | | |
|---|---|---|
| 1,123,839 | 6/1956 | France. |
| 1,164,766 | 1/1957 | France. |
| 899,968 | 12/1953 | Germany. |
| 285,561 | 1/1953 | Switzerland. |

ROY D. FRAZIER, *Primary Examiner.*

CLAUDE A. LE ROY, *Examiner.*

J. F. FOSS, *Assistant Examiner.*